3,084,179
PHOSPHOROUS-CONTAINING-LIGAND STABILIZED TRANSITION METAL COMPOUNDS
Joseph Chatt, St. Albans, and Roy Graham Hayter, Welwyn, England, assignors to Imperial Chemical Industries Limited, London, England, a corporation of Great Britain
No Drawing. Filed Feb. 11, 1960, Ser. No. 7,975
Claims priority, application Great Britain Feb. 27, 1959
1 Claim. (Cl. 260—429)

This invention relates to new complex compounds which are ligand stabilised transition metal alkyls, aryls, alkylhalides, arylhalides, alkylthiocyanates or arylthiocyanates.

We have found that molecules of transition metal alkyls, aryls, alkylhalides, arylhalides, alkylthiocyanates or arylthiocyanates, which may have no stable independent existence, and molecules of ligands as hereinafter specified may exist in combination as stable complex compounds. A complex compound of this kind has many of the properties which the corresponding free metal compound would be expected to have; and therefore the formation of such a complex compound provides a method of effectively stabilising the metal alkyl, aryl, alkylhalide, arylhalide, alkylthiocyanate or arylthiocyanate respectively.

According to the present invention there are provided new complex compounds each of which comprises two constituents, namely a transition metal arkyl, aryl, alkylhalide, arylhalide, alkylthiocyanate or arylthiocyanate, and a constituent having the structure

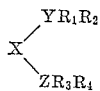

in which X is a divalent hydrocarbon radical, Y and Z are atoms of elements belonging to group Va of the periodic table, and $R_1$, $R_2$, $R_3$ and $R_4$ are univalent hydrocarbon radicals.

Particularly suitable transition metals are those belonging to group VIII of the periodic table, such as for example ruthenium and osmium.

The alkyl- or aryl- halide may be, for example, an alkyl- or aryl- chloride, bromide or iodide.

The alkyl or aryl groups bonded to the transition metal may be lower alkyl or aryl groups, such as for example methyl, ethyl, n-propyl or phenyl.

Y and Z may be attached to the same or different carbon atoms in the radical X; but it is preferred that the chain length between the atoms Y and Z is at most 3 carbon atoms.

X may conveniently be a lower alkylene or arylene radical, such as for example methylene, ethylene or o-phenylene.

Y and Z are preferably nitrogen, phosphorus or arsenic, phosphorus and arsenic being the elements which are most preferred. Although Y and Z may conveniently be identical, they need not be so: for example Y and Z may be phosphorus and arsenic respectively.

$R_1$, $R_2$, $R_3$ and $R_4$ may conveniently be lower alkyl or aryl radicals, such as for example methyl or phenyl. Although they may all be different, it is preferred that $R_1$ and $R_2$ be respectively identical to $R_3$ and $R_4$; and more preferably $R_1$, $R_2$, $R_3$ and $R_4$ should all be identical.

The general formula of compounds according to the present invention may be written as

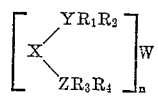

in which W is a transition metal alkyl, aryl, alkylhalide, arylhalide, alkylthiocyanate or arylthiocyanate, X, Y, Z, $R_1$, $R_2$, $R_3$ and $R_4$ are as hereinbefore defined, and $n$ depends on the transition metal. For example when the transition metal is ruthenium or osmium it is believed that $n$ is 2 and that W is RuRX or OsRX respectively, R being an alkyl or aryl radical and X a halogen atom or a thiocyanate, alkyl or aryl radical.

A number of examples of compounds as hereinbefore defined are mentioned in the table below, in which is given the relevant decomposition melting points and calculated and observed quantitative analytical figures for carbon, hydrogen and (in some cases) iodine.

A complex compound according to the present invention may be prepared by heating a corresponding complex transition metal dihalide or dithiocyanate with a metal alkyl or aryl, substantially in the absence of oxygen and moisture. The metal alkyl or aryl may conveniently be an aluminium or lithium alkyl or aryl.

The product may be purified by recrystallisation from a suitable solvent.

The process occurs in two stages: the dihalide or dithiocyanate complex is first converted into an alkyl- or aryl- halide, or alkyl- or aryl- thiocyanate respectively, and, if desired, the reaction may be stopped at this point; further reaction yields a dialkyl or diaryl complex.

A complex alkyl- or aryl- halide, or alkyl- or aryl- thiocyanate according to the invention may also be prepared by treating in solution a corresponding alkyl- or aryl- hydride with a hydrohalide or thiocyanic acid. The product may conveniently be isolated chromatographically, and, if desired, recrystallised from a suitable solvent.

A complex alkyl- or aryl- halide or alkyl- or aryl- thiocyanate according to the invention may conveniently be made by anion exchange. This process comprises heating in solution such a complex alkyl- or aryl- halide or alkyl- or aryl- thiocyanate with a halide or thiocyanate, the anions of the two reactants being different. The product may conveniently be isolated chromatographically, and, if desired, may be recrystallised from a suitable solvent. This method is particularly applicable to the preparation of complex alkyl- or aryl- bromides, iodides and thiocyanates, by reaction of corresponding complex alkyl- or aryl- chlorides with, for example, lithium bromide, iodide or thiocyanate.

Processes as defined above are illustrated by the examples below. Examples 1, 2, 3 and 4 describe the preparation of complex methyl chlorides by reaction between complex dichlorides and trimethyl aluminium; Examples 5 and 6 describe the preparation of complex ethyl chlorides by reaction between complex dichlorides and triethyl aluminium; Example 7 describes the preparation of a complex methyl chloride by reaction between a complex methyl hydride and hydrogen chloride; Examples 8 and 9 describe the preparation of complex alkyl-bromides and iodides either by reaction between complex alkyl-chlorides and lithium bromide or iodide or by reaction between complex alkyl-hydrides and hydrobromic or hydriodic acid; Example 10 describes the preparation of a complex methylthiocyanate by reaction between a complex methylchloride and lithium thiocyanate; and Example 11 describes the preparation of a complex phenyl chloride by reaction between a complex dichloride and phenyl lithium.

Compounds according to the invention are believed to exhibit stereoisomerism, and to exist in cis and trans forms. Which isomer is produced by a particular process depends on the nature of the reactants. For instance it will be seen from the examples that when a complex dichloride of the kind described reacts with trimethyl aluminium or phenyl lithium steric inversion occurs—i.e. a cis dichloride complex gives a trans methylchloride or phenylchloride complex respectively, and vice versa in the case of trimethyl aluminium; whereas when triethyl aluminium or tri-n-propyl aluminium is reacted with a dichloride complex of either the cis or the trans configuration, the trans alkylchloride is obtained. The products of the other types of reaction described in the examples have configurations corresponding to those of the complexes from which they are prepared.

Complex compounds according to the invention are useful as catalysts—for example as alkylation or arylation catalysts. The alkylhalide or arylhalide complexes may be used in the preparation of corresponding alkylhydrides and arylhydrides.

EXAMPLE 1

Trans-$(C_2H_4(PPh_2)_2)_2RuCl_2$ was prepared in 90% yield by direct reaction between either $((PPh_2Et)_3RuCl_2)_2$ or $((PPhEt_2)_3RuCl_2)_2$ and 2 molar equivalents of $C_2H_4(PPh_2)_2$. It was also prepared, but in lower yield, by the direct action of $C_2H_4(PPh_2)_2$ on an aqueous ethanolic solution of ruthenium trichloride. The product in each case was crystallised from chloroform as shining plates having a decomposition melting point of 285° C. Analysis indicated 66.41% C and 5.19% H, as compared with the theoretical figures of 64.4% C and 4.99% H.

0.50 gm. of trans-$(C_2H_4(PPh_2)_2)_2RuCl_2$ was heated in a nitrogen-filled dry box with 1 ml. of trimethyl aluminium. The resulting deep red oil was cooled and then washed with petrol. Just sufficient alcohol was added to decompose the oil, giving a yellow solution which deposited crystals on cooling. The crystalline product was taken from the dry box, and solvent was removed by filtration. The yield was 0.40 gm. of cis-$(C_2H_4(PPh_2)_2)_2RuMeCl$ which on crystallisation from benzene gave pale yellow platelets.

EXAMPLE 2

Cis-$(C_2H_4(PPh_2)_2)_2OsMeCl.\frac{1}{2}C_6H_6$ and cis-$(CH_2(PPh_2)_2)_2OsMeCl$ were prepared by methods similar to that described in Example 1.

EXAMPLE 3

Cis-$(CH_2(PPh_2)_2)_2RuCl_2$ was reacted with trimethyl aluminum by a method similar to that described in Example 1, giving a 75% yield of trans-$(CH_2(PPh_2)_2)_2RuMeCl$ The product was recrystallised from a mixture comprising equal volumes of benzene and petrol, and was obtained as pale yellow plates. The recrystallised product was dried in vacuo at 100° C. for 16 hours in order to remove benzene of solvation.

EXAMPLE 4

Trans-$(C_2H_4(PMe_2)_2)_2RuMeCl$ and trans-$(CH_2(PPH_2)_2)_2OsMeCl$ were prepared by methods similar to that described in Example 3.

EXAMPLE 5

Cis-$(CH_2(PPh_2)_2)_2OsCl_2$ reacted with triethyl aluminum by a method similar to that described in Example 1, giving an 80% yield of trans-$(CH_2(PPh_2)_2)_2OsEtCl.\frac{1}{2}C_6H_6$ The product was recrystallised from a mixture comprising equal volumes of benzene and petrol, and was obtained as golden yellow needles.

The same product was obtained by similar reaction between triethyl aluminium and trans-$(CH_2(PPh_2)_2)_2OsCl_2$

EXAMPLE 6

Trans-$(C_2H_4(PPh_2)_2)_2RuEtCl$
trans-$(C_2H_4(PPh_2)_2)_2RuPr^nCl$
trans-$(CH_2(PPh_2)_2)_2RuEtCl.\frac{1}{2}C_6H_6$ and
trans-$(C_2H_4(PPh_2)_2)_2OsEtCl$ were prepared by a method similar to that described in Example 5 from the corresponding dihalo compounds of either cis or trans configuration.

EXAMPLE 7

A solution of 0.20 gm. of $(C_2H_4(PPh_2)_2)_2RuHMe$ in 3 ml. of benzene was treated with an equivalent weight of hydrogen chloride dissolved in 1.3 ml. of ether. Hydrogen was evolved, and the colour of the solution changed from colourless to yellow. The solution was allowed to stand for 10 minutes and was then chromatographed on alumina. Elution with benzene containing 20% of ether afforded 0.10 gm. of trans-$(C_2H_4(PPh_2)_2)_2RuMeCl$ corresponding to a yield of 48%. The product was recrystallised from benzene containing 30% of petrol, and was obtained as pale yellow prisms.

EXAMPLE 8

0.64 gm. of cis-$(C_2H_4(PPh_2)_2)_2RuMeCl$ was refluxed in dry tetrahydrofuran with excess lithium bromide (2.0 gm.) for 24 hours, during which time the solution darkened slowly from yellow to light brown. The solvent was then removed at a pressure of 12 mm. Hg, the brown water-insoluble residue remaining was dissolved in 20 ml. of chloroform, and the resulting solution was chromatographed on alumina. Elution with benzene afforded cis-$(C_2H_4(PPh_2)_2)_2RuMeBr$. This was recrystallised from benzene containing 50% of petrol, giving 0.35 gm. of pale orange prisms, corresponding to a yield of 50%.

EXAMPLE 9

Trans-$(C_2H_4(PMe_2)_2)_2RuMeI$
trans-$(C_2H_4(PPh_2)_2)_2RuMeBr$
cis-$(C_2H_4(PPh_2)_2)_2RuMeI.\frac{1}{2}C_6H_6$
trans-$(C_2H_4(PPh_2)_2)_2RuMeI$
trans-$(C_2H_4(PPh_2)_2)_2RuEtI$ and
trans-$(C_2H_4(PPh_2)_2)_2RuPr^nBr$ were prepared by halide exchange, using a method similar to that described in Example 8, and, except in the case of the cis compound, by reaction between the corresponding complex alkylhydride and hydrobromic or hydriodic acid, using a method similar to that described in Example 7.

EXAMPLE 10

Cis-$(C_2H_4(PPh_2)_2)_2RuMeSCN$ was prepared in 70% yield by anion exchange by a method similar to that described in Example 8, using lithium thiocyanate.

EXAMPLE 11

0.50 gm. of cis-$(C_2H_4(PMe_2)_2)_2RuCl_2$ was suspended in 15 ml. of benzene and treated with 2.2 moles of phenyl lithium in 11.5 ml. of ether. The colour of the resulting mixture darkened to orange from pale yellow, and the complex dissolved during 90 minutes shaking. 0.5 ml. of ethanol was then added and the solvent was distilled off at a pressure of 12 mm. Hg. The benzene-soluble residue was crystallised from acetone, slight decomposition occurring, and was then sublimed in vacuo at 200° C., giving colourless crystals of trans-$(C_2H_4(PMe_2)_2)_2RuPhCl$ The presence of the phenyl group in the product was confined by infra red spectroscopy.

Table

| Compound | Example | Decomposition melting point, 0° C. | Calculated C, percent | Calculated H, percent | Calculated I, percent | Observed C, percent | Observed H, percent | Observed I, percent |
|---|---|---|---|---|---|---|---|---|
| cis-$(C_2H_4(PPh_2)_2)_2RuMeCl$ | 1 | [1] 312–315 | 67.1 | 5.4 | -------- | 67.1 | 5.35 | -------- |
| cis-$(C_2H_4(PPh_2)_2)_2OsMeCl.½C_6H_6$ | 2 | [1] 295–296 | 62.5 | 5.1 | -------- | 62.75 | 5.2 | -------- |
| cis-$(CH_2(PPh_2)_2)_2OsMeCl$ | 2 | 140–150 | 60.7 | 4.7 | -------- | 60.8 | 4.8 | -------- |
| trans-$(CH_2(PPh_2)_2)_2RuMeCl$ | 3 | 225–227 | 66.55 | 5.15 | -------- | 66.7 | 5.4 | -------- |
| trans-$(C_2H_4(PMe_2)_2)_2RuMeCl$ | 4 | [1] 314–316.5 | 34.55 | 7.8 | -------- | 34.8 | 7.8 | -------- |
| trans-$(CH_2(PPh_2)_2)_2OsMeCl$ | 4 | [1] >350 | 60.7 | 4.7 | -------- | 61.0 | 4.65 | -------- |
| trans-$(C_2H_4(PPh_2)_2)_2OsEtCl.½C_6H_6$ | 5 | [1] 294.5–297.5 | 62.2 | 4.9 | -------- | 62.3 | 5.0 | -------- |
| trans-$(C_2H_4(PPh_2)_2)_2RuEtCl$ | 6 | [1] 328–335 | 67.4 | 5.55 | -------- | 67.2 | 5.6 | -------- |
| trans-$(C_2H_4(PPh_2)_2)_2RuPr^nCl$ | 6 | [1] 332–335 | 67.65 | 5.7 | -------- | 67.8 | 5.5 | -------- |
| trans-$(CH_2(PPh_2)_2)_2RuEtCl.½C_6H_6$ | 6 | [1] 289–290 | 67.9 | 5.4 | -------- | 68.0 | 5.5 | -------- |
| trans-$(C_2H_4(PPh_2)_2)_2OsEtCl$ | 6 | [1] 310–314 | 61.7 | 5.1 | -------- | 61.4 | 5.0 | -------- |
| trans-$(C_2H_4(PPh_2)_2)_2RuMeCl$ | 7 | [1] 333.5–336.5 | 67.1 | 5.4 | -------- | 67.0 | 5.3 | -------- |
| cis-$(C_2H_4(PPh_2)_2)_2RuMeBr$ | 8 | [1] 307–309.5 | 64.1 | 5.2 | -------- | 64.4 | 5.4 | -------- |
| trans-$(C_2H_4(PMe_2)_2)_2RuMeI$ | 9 | 292.5–300 | 28.7 | 6.5 | -------- | 28.5 | 6.4 | -------- |
| trans-$(C_2H_4(PPh_2)_2)_2RuMeBr$ | 9 | [1] 366–369 | 64.1 | 5.2 | -------- | 64.4 | 5.2 | -------- |
| cis-$(C_2H_4(PPh_2)_2)_2RuMeI.½C_6H_6$ | 9 | [1] 328–331 | 62.3 | 5.0 | 11.8 | 62.7 | 5.1 | 12.1 |
| trans-$(C_2H_4(PPh_2)_2)_2RuMeI$ | 9 | [1] 398–402 | 61.2 | 4.9 | -------- | 61.55 | 5.2 | -------- |
| trans-$(C_2H_4(PPh_2)_2)_2RuEtI$ | 9 | [1] 397–402 | 61.5 | 5.1 | 12.0 | 61.9 | 5.2 | 12.2 |
| trans-$(C_2H_4(PPh_2)_2)_2RuPr^nBr$ | 9 | [1] 362–365 | 64.7 | 5.4 | -------- | 64.4 | 5.3 | -------- |
| cis-$(C_2H_4(PPh_2)_2)_2RuMeSCN$ | 10 | 283–285 | 66.8 | 5.3 | -------- | 66.8 | 5.4 | -------- |
| trans-$(C_2H_4(PMe_2)_2)_2RuPhCl$ | 11 | 215–219 Sublimed at 190° C. | 42.1 | 7.3 | -------- | 41.8 | 7.3 | -------- |

[1] Melting point determined in vacuo.

We claim:

A complex compound selected from the group consisting of compounds having the formulae:

cis-$(C_2H_4(PPh_2)_2)_2RuMeCl$
cis-$(C_2H_4(PPh_2)_2)_2OsMeCl.½C_6H_6$
cis-$(CH_2(PPh_2)_2)_2OsMeCl$
cis-$(C_2H_4(PPh_2)_2)_2RuMeBr$
trans-$(C_2H_4(PPh_2)_2)_2RuMeCl$
trans-$(C_2H_4(PMe_2)_2)_2RuMeI$
trans-$(C_2H_4(PPh_2)_2)_2RuMeBr$
cis-$(C_2H_4(PPh_2)_2)_2RuMeI.½C_6H_6$
trans-$(C_2H_4(PPh_2)_2)_2RuMeI$
trans-$(C_2H_4(PPh_2)_2)_2RuEtI$
trans-$(C_2H_4(PPh_2)_2)_2RuPr^nBr$
cis-$(C_2H_4(PPh_2)_2)_2RuMeSCN$
trans-$(C_2H_4(PMe_2)_2)_2RuPhCl$ in which Ph stands for phenyl, Me stands for methyl, $Pr^n$ stands for normal propyl, and Et stands for ethyl.

References Cited in the file of this patent

UNITED STATES PATENTS 2,922,819   Chatt et al. _____ Jan. 26, 1960

OTHER REFERENCES

Mann: "Chemistry and Industry," April 29, 1939, pp. 401–403.

Allison et al.: "Journal of the Chemical Society" (London), November 1949, pp. 2915–2921.

Bailar: "The Chemistry of the Coordination Compounds," 1956, A.C.S. Monograph No. 131, Reinhold Pub. Corp., pp. 78–86.